United States Patent

[11] 3,617,148

| [72] | Inventor | James W. Endress |
| | | Syracuse, N.Y. |
| [21] | Appl. No. | 38,424 |
| [22] | Filed | May 18, 1970 |
| [45] | Patented | Nov. 2, 1971 |
| [73] | Assignee | Carrier Corporation |
| | | Syracuse, N.Y. |

[54] THRUST BEARING FOR REFRIGERATION COMPRESSOR
10 Claims, 4 Drawing Figs.

[52] U.S. Cl. .................................................. 415/90, 416/4, 416/116
[51] Int. Cl. ..................................................... F01d 1/18, F03b 1/00, F03b 3/00
[50] Field of Search .......................................... 415/90, 71, 76, 116; 416/4

[56] References Cited
UNITED STATES PATENTS

| 557,300 | 3/1896 | Barber | 415/90 X |
| 1,065,732 | 6/1913 | Schneible | 415/71 |
| 1,295,621 | 2/1919 | Simond | 415/71 X |
| 1,990,059 | 2/1935 | Bertin | 415/71 UX |
| 2,954,157 | 9/1960 | Eckberg | 415/90 |
| 3,226,012 | 12/1965 | Trask | 415/90 X |

Primary Examiner—Carlton R. Croyle
Assistant Examiner—Richard E. Gluck
Attorneys—Harry G. Martin, Jr. and J. Raymond Curtin ABSTRACT: The thrust bearing disc is formed in the face side engaging the thrust collar with grooves extending outwardly from the shaft to an annular enclosed space. An oil and refrigerant mixture is supplied to the inner ends of the grooves. The grooved bearing disc in cooperation with the rotating thrust collar serves as a pump, pressurizing the mixture to provide forced lubrication between the collar and the thrust bearing disc and to prevent flashing of the refrigerant from the oil.

PATENTED NOV 2 1971

3,617,148

INVENTOR.
JAMES W. ENDRESS
BY Bennett Thompson
ATTORNEY 3,617,148

THRUST BEARING FOR REFRIGERATION COMPRESSOR

BACKGROUND OF THE INVENTION

It is necessary to employ thrust bearings in centrifugal refrigeration compressors. The power shaft on which the impeller is mounted is subjected to considerable end thrust force during operation of the compressor. It is, accordingly, necessary to provide sufficient and proper lubrication between the shaft thrust collar and the thrust bearing disc. Inasmuch as the lubricating oil becomes absorbed with refrigerant, difficulty is incurred in that the friction created in the operation of the bearing raises the temperature of the mixture sufficient to cause flashing or vaporization of the refrigerant from the mixture. The flashing of the refrigerant results in reducing the lubricating quality of the mixture, and the flashing is of such violence as to eject the mixture from between the engaging surfaces of the bearing without providing proper lubrication.

SUMMARY OF THE INVENTION

My invention is directed to a thrust bearing structure embodying an arrangement which is effective to prevent flashing of the refrigerant from the oil-refrigerant mixture. The shaft thrust collar is formed with grooves extending outwardly from the shaft, the outer ends of the grooves communicating with an annular enclosed spaced having a discharge passage sufficiently restricted whereby the thrust collar acts as an impeller to pressurize the oil-refrigerant mixture to a value sufficient to prevent flashing of the refrigerant.

DESCRIPTION OF THE PREFERRED EMBODIMENT

Figures 1, 2, 3, 4:
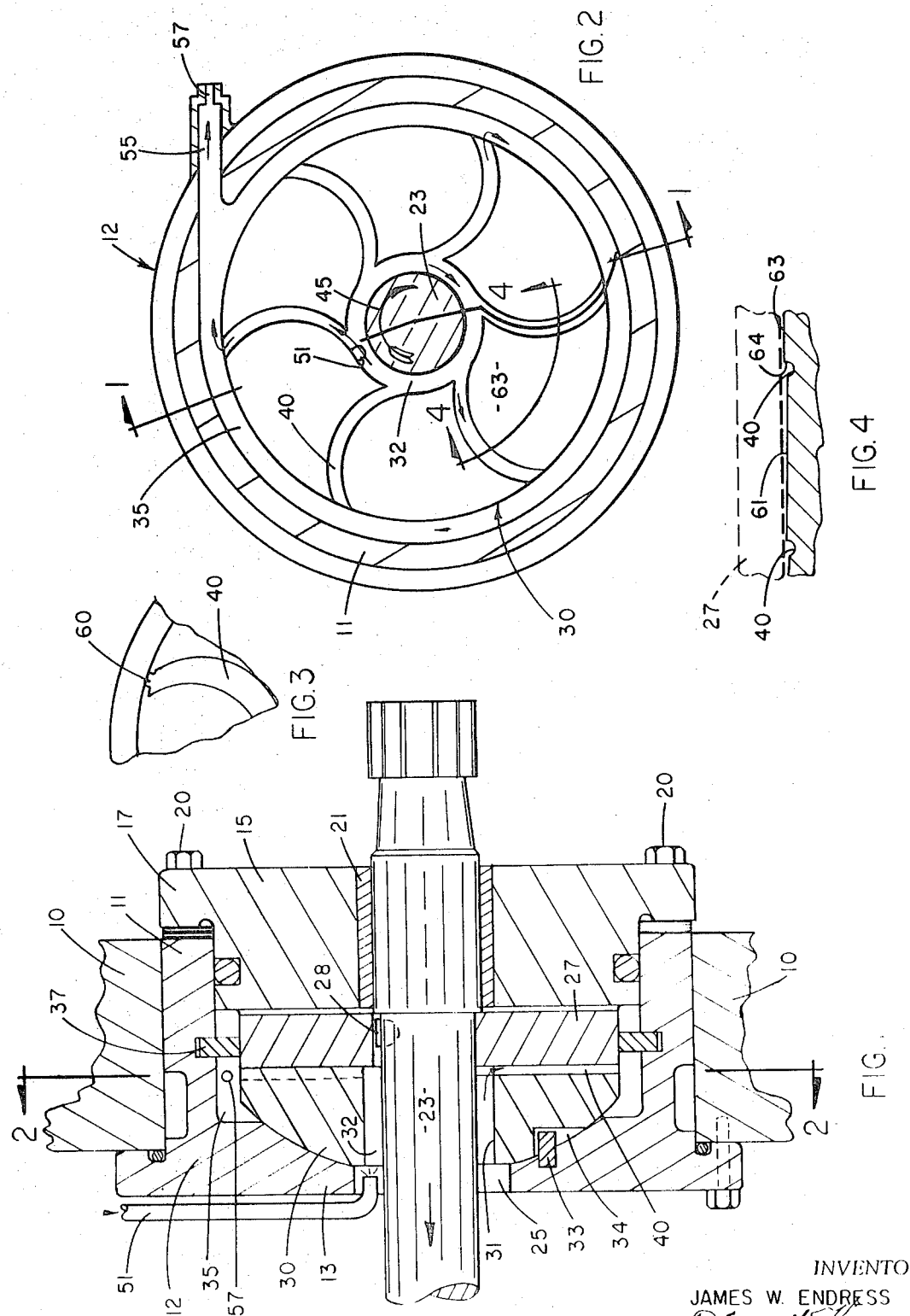
FIG. 1 is a sectional view of a thrust bearing structure embodying my invention.
FIG. 2 is a face view in elevation of the shaft thrust collar, the view being taken on line 2-2 of FIG. 1.
FIG. 3 is a fragmentary view at the outer end of one of the shaft collar grooves formed with a restriction.
FIG. 4 is a fragmentary sectional view taken on line 4—4 of FIG. 2.

The numeral 10 designates a crossmember mounted in the casing of the machine. The crossmember is bored to receive the cylindrical flange 11 of a support member 12 formed with an end wall 13. A disc 15 is mounted in one end of the flange 11 and has a radial flange 17 overlapping the end of the flange 11 and being secured thereto as by cap screws 20. The disc 15 is provided with a central bearing 21 in which the drive shaft 23 of the compressor is journaled. The shaft 23 extends through an aperture 25 formed in the center of the support end wall 13 and which encircles the shaft in concentrically spaced relation thereto. A thrust collar member 27 is fixed to the shaft 23 as by means of a key 28. A thrust bearing member 30 encircles the shaft 23 and is positioned against the inner surface of the end wall 13 of the support. The confronting surfaces of the end wall and the thrust bearing member 30 are of spherical form whereby the thrust bearing is permitted movement relative to the support 12 in order that the opposite face side of the thrust bearing may properly engage the thrust collar 27. The thrust bearing member 30 is formed with a bore 31 spaced concentrically about the shaft 23 forming an annular passage 32 extending axially from the aperture 25 to the thrust collar 27. The thrust bearing member is restrained against rotation as by a pin 33 fixed in the end wall 13 and extending into a slot 34 in the bearing member 30.

The bore of the support member 12 is of greater diameter than the diameter of the thrust collar 27 and the bearing 30. Accordingly, these members are mounted in a cavity formed in the support, there being an annular space 35 encircling the collar and thrust bearing. A seal 37 is mounted in the bore of the support and has sealing engagement with the periphery of the thrust collar 27.

In the illustrated embodiment of the invention shown in the drawings, the side surface of the bearing disc, 30 engaging the confronting side surface of the thrust collar 27, is formed with a plurality of grooves 40. The inner ends of the grooves 40 communicate with the annular passage 32 encircling the shaft 23. The grooves 40 extend outwardly from the shaft and, at their outer ends, communicate with the annular space 35. Preferably, the grooves 40 are formed on a curvature so that the inner ends of the grooves merge with the passage 32 in tangential relation thereto. With the shaft rotating in the direction shown by the arrow 45 (FIG. 2), the curved grooves 40 provide for backward leaving of the oil and refrigerant mixture.

Oil and refrigerant mixture is supplied to the passage 32 by a conduit 51. Accordingly, the supply of oil is fed to the inner ends of the grooves 40 and is moved radially outwardly through the grooves by action of the rotating collar 27 and discharged into the annular space 35.

The support 12 is formed with a discharge passage 55 arranged tangentially to the annular space 35 and extending outwardly therefrom. The outer end of the discharge passage 55 is provided with an orifice or restricted area 57. The restriction 57 is dimensioned to provide sufficient impedance to the flow of the mixture through the grooves 40 to pressurize the mixture to a value sufficient to prevent or minimize the flashing of the refrigerant within the bearing structure.

The outer ends of the grooves 40 may also terminate at a restricted opening indicated at 60 (FIG. 3). This restriction, in like manner, effects pressurization of the refrigerant-oil mixture and is especially effective to prevent flashing of the refrigerant in the circular space 32 and at the inner ends of the grooves 40. The restrictions 60 may be used in combination with the restriction 57, or alternatively in place thereof.

The areas 63 of the face side surface of the thrust bearing member 30, intermediate the grooves 40, are inclined upwardly in a direction toward the rotation of the thrust collar, this inclination being indicated by line 61 (FIG. 4). With this arrangement, the high edges 64 of the grooves 40 establish an oil wedge which is wiped across the face of the thrust bearing 30 to effect proper lubrication and to force the liquid mixture into and outwardly through the grooves 40.

I claim:

( A thrust bearing structure for refrigerant compressor drive comprising a support, a compressor drive shaft journaled in said support, said support being formed with a closed circular cavity arranged in concentrically spaced relation to said shaft, a thrust bearing member, a thrust collar member, said members encircling said shaft and being disposed in side-by-side abutting relation in said cavity, one of said members being fixed to said shaft for rotation therewith, the other of said members being restrained against rotation and being formed with a bore spaced concentrically about said shaft, said members being of less diameter than said cavity, whereby said members are encircled by an annular space, the side surface of one of said members abutting against said other member being formed with a plurality of grooves extending outwardly from said shaft and communicating with said annular space, means operable to maintain a mixture of oil and refrigerant between the bore of said other member and said shaft, said members being cooperable upon rotation of said one member to effect a pressurized flow of said mixture outwardly through said grooves to said annular space, and said support being formed with a discharge passage extending outwardly from said annular space.

2. A thrust bearing structure as set forth in claim 1 wherein said discharge passage is of restricted area.

3. A thrust bearing structure as set forth in claim 1 wherein said discharge passage extends tangentially from said annular space.

4. A thrust bearing structure as set forth in claim 1 wherein each of said grooves is formed with an inlet portion arranged tangentially to said shaft.

5. A thrust bearing structure as set forth in claim 1 wherein the outer ends of said grooves are of restricted cross-sectional area.

6. A thrust bearing structure as set forth in claim 1 wherein said grooves are formed on a curvature to provide for backward leaving of the mixture from the grooves.

7. A thrust bearing structure as set forth in claim 1 wherein said thrust collar member is fixedly mounted on said shaft.

8. Thrust bearing structure as set forth in claim 1 wherein said grooves are formed in said thrust bearing member.

9. A thrust bearing structure as set forth in claim 9 wherein an annular sealing member is mounted in said support in said annular space, said sealing member encircling said one of such members and having sealing engagement with the periphery thereof.

10 A thrust bearing structure as set forth in claim 1 wherein said grooves are formed in the other of said members.

* * * * *